United States Patent
Murdoch et al.

(10) Patent No.: US 11,438,156 B2
(45) Date of Patent: Sep. 6, 2022

(54) METHOD AND SYSTEM FOR SECURING DATA

(71) Applicant: Haventec Pty Ltd, Sydney (AU)

(72) Inventors: Vernon Murdoch, Wooloowin (AU); Naveen Neti, Eastwood (AU); John Kelaita, Riverwood (AU)

(73) Assignee: Haventec Pty Ltd, Sydney (AU)

( * ) Notice: Subject to any disclaimer, the term of this patent is extended or adjusted under 35 U.S.C. 154(b) by 7 days.

(21) Appl. No.: 17/266,537

(22) PCT Filed: Aug. 7, 2019

(86) PCT No.: PCT/AU2019/050828
§ 371 (c)(1),
(2) Date: Feb. 5, 2021

(87) PCT Pub. No.: WO2020/028950
PCT Pub. Date: Feb. 13, 2020

(65) Prior Publication Data
US 2021/0320795 A1    Oct. 14, 2021

(30) Foreign Application Priority Data
Aug. 7, 2018    (AU) .............................. 2018902873

(51) Int. Cl.
*H04L 9/00*    (2022.01)
*H04L 9/30*    (2006.01)
*G06F 21/60*    (2013.01)

(52) U.S. Cl.
CPC .......... *H04L 9/3033* (2013.01); *G06F 21/602* (2013.01); *H04L 2209/16* (2013.01)

(58) Field of Classification Search
CPC .. H04L 9/3033; H04L 2209/16; G06F 21/602
See application file for complete search history.

(56) References Cited

U.S. PATENT DOCUMENTS

| | | | |
|---|---|---|---|
| 6,446,205 B1 * | 9/2002 | Lenstra | H04L 9/3073 380/278 |
| 6,662,299 B1 * | 12/2003 | Price, III | G06F 21/6209 713/171 |

(Continued)

FOREIGN PATENT DOCUMENTS

| | | |
|---|---|---|
| AU | 2015/203172 | 7/2015 |
| WO | WO 2016/130030 | 8/2016 |

OTHER PUBLICATIONS

"Shamir's Secret Sharing," Wikipedia accessed on Jan. 9, 2019.
(Continued)

*Primary Examiner* — Gary S Gracia
(74) *Attorney, Agent, or Firm* — Knobbe, Martens, Olson & Bear, LLP

(57) ABSTRACT

A method of encrypting and storing a data item; said method comprising: a data encryption step wherein the data item is encrypted to form an encrypted data item; a mathematical disassembly step wherein the encrypted data item is mathematically disassembled into two or more encrypted data item component parts comprising at least a first component part and a second component part; storing at least a one of the component parts at a location separate from the others of the component parts.

19 Claims, 10 Drawing Sheets

(56) References Cited

U.S. PATENT DOCUMENTS

| | | | | |
|---|---|---|---|---|
| 7,082,539 B1* | 7/2006 | Kitahara | | G06F 21/71 |
| | | | | 713/189 |
| 7,685,430 B1* | 3/2010 | Masurkar | | H04L 63/1466 |
| | | | | 380/255 |
| 9,866,554 B2* | 1/2018 | Choi | | H04L 9/3234 |
| 11,184,157 B1* | 11/2021 | Gueron | | H04L 9/3247 |
| 2012/0173883 A1* | 7/2012 | Orsini | | H04L 63/04 |
| | | | | 713/189 |
| 2013/0179682 A1* | 7/2013 | Ramachandran | | H04L 9/3033 |
| | | | | 713/160 |
| 2013/0304761 A1* | 11/2013 | Redlich | | G06Q 10/06 |
| | | | | 707/781 |
| 2014/0082376 A1* | 3/2014 | Roden | | H04L 67/1097 |
| | | | | 713/193 |
| 2014/0108796 A1* | 4/2014 | Johnson | | G06F 21/6218 |
| | | | | 713/167 |
| 2014/0129227 A1* | 5/2014 | Hagg | | G10L 15/183 |
| | | | | 704/254 |
| 2014/0164790 A1* | 6/2014 | Dodgson | | G06Q 10/10 |
| | | | | 713/193 |
| 2017/0154042 A1* | 6/2017 | Meyer | | G06F 16/2255 |
| 2021/0319441 A1* | 10/2021 | Knobel | | G06Q 20/3829 |
| 2021/0320795 A1* | 10/2021 | Murdoch | | G06F 21/602 |

OTHER PUBLICATIONS

Boyle, Elette et al., "Homomorphic Secret Sharing: Optimizations and Applications." Downloaded from European Patent Office on Jul. 11, 2018.

Balasaraswathi, V.R et al., 'Enhanced security for multi-cloud storage using cryptographic data splitting with dynamic approach', 2014 IEEE International Conference on Advanced Communications, Control and Computing Technologies, Ramanathapuram, 2014, pp. 1190-1194. [online], [retrieved from internet on Nov. 26, 2018] <URL: http://ieeexplore.ieee.org/stamp/stamp.jsp?tp=&arnumber=7019286&isnumber=7019129 >.

International Search Report and Written Opinion for PCT/AU2019/050828, dated Nov. 27, 2019.

* cited by examiner

FLOW CHART

FLOW CHART

METHOD AND SYSTEM FOR SECURING DATA

The present invention relates to a method and system for securing data and more particularly, although not exclusively, to a system that combines use of multiple strategies.

BACKGROUND

Techniques such as data obfuscation and encryption are well known in the art as methods for securing data. Obfuscation of data typically involves offsetting of data with a random key set.

In addition to this operator try to hide data in various obscure locations on the network. This technique is commonly called "security through obscurity". This technique is well known and typically effective only where a hacker has limited time on the network. This is not a defensible strategy in today's hacking climate.

Other problems that exist is the common practice of centrally storing keys for encryption systems and the central storage of the encrypted and protected data. Both these practices make it easy for hackers to find and attack both the data and the key store.

In yet another common practice the use of encryption keys to protect multiple sets of protected data means that a successful attack on one data set will yield successful attacks on all of the data sets.

U.S. Pat. No. 7,685,430 to Sun Microsystems utilizes multiple applications of encryption algorithms. In this instance the techniques are applied in the context of providing a temporary password in an internet hosted environment—more particularly a one-time password.

In the arrangement of U.S. Pat. No. 7,685,430 the keys which are used for the encryption algorithms comprise static data—which is to say the same data used repeatedly across multiple instances of the encryption algorithms.

In addition U.S. Pat. No. 7,685,430 does not describe any strategies for segmenting data with a view to storing portions of the data in distributed locations.

The arrangement of the present application is intended for data which needs to be preserved sometimes for significant periods of time—of the order of one year or sometimes longer. It is particularly suited and intended for data which has commercial significance—that is to say data which tends to be a particularly attractive target for the hacking community—a so called 'honey pot'. Such data may include credit card data, server certificates and the like.

It is to be noted that very serious responsibilities now attach to those who store this kind of data. As a minimum in many jurisdictions there is a mandatory reporting requirement if a breach is determined to have occurred.

A powerful obfuscation system that goes beyond a standard strategy combined with a distributed remote storage technique for both the data being protected and the encryption keys is not currently used.

The described invention is designed to address these issues.

BRIEF DESCRIPTION OF INVENTION

Definitions

Obfuscation: Conceal data or code by use of an algorithm applied to the data or code. Knowledge of the algorithm is required to reveal the data or code that has been concealed.

Alphanumeric Element: A single character selected from numbers or letters or special characters.

Character String: Two or more characters concatenated into a single string of characters.

Data Encryption: Apply an algorithm to an input character string which outputs a character string different from the input character string. The output character string is an encryption of the input character string. The input character string is recoverable from the output character string subject to use of decryption parameters or arguments (known as keys in some instances). Access to the parameters or arguments is controlled whereby only authorized parties can recover (or decrypt) the input character string from the output character string.

Data Padding: The addition of characters to a character string thereby to lengthen the character string.

Data Mapping: Convert a character to a character string utilizing a lookup table—for example, an alpha numeric character may be converted to a string of numbers by use of an ASCII translation table.

Remote Location: A location which is separated from another location by distance or logic.

Accordingly in one broad form of the invention there is provided a method of encrypting and storing a data item; said method comprising:
  a data encryption step wherein the data item is encrypted to form an encrypted data item;
  a mathematical disassembly step wherein the encrypted data item is mathematically disassembled into two or more encrypted data item component parts comprising at least a first component part and a second component part;
  storing at least a one of the component parts at a location separate from the others of the component parts.

Preferably the location separation is by logical memory separation.

Preferably the location separation is by use of separate servers.

Preferably the location separation is by geographic separation.

Preferably the location separation is geographic separation of separate servers, each server holding different ones of the component parts forming the encrypted data item.

Preferably, the location separation is by logical memory separation whereby the at least a first component part is stored in a first logical memory and the at least a second component part is stored in a second logical memory.

Preferably, the location separation is by use of separate servers whereby the at least a first component part is stored in a first server and the at least a second component part is stored in a second server.

Preferably, the location separation is by geographic separation whereby the at least a first component part is stored in a first geographic location and the at least a second component part is stored in a second geographic location and wherein the first geographic location is geographically separated from the second geographic location.

Preferably the data encryption step includes the step of encrypting the data item using an encryption key as a parameter in an algorithm which encrypts the data item.

Preferably the data item is padded before the data encryption step.

Preferably the encryption key is a symmetric key.

Preferably the encrypted data item is mapped by an encrypted data item mapping step to form a mapped encrypted data item prior to the mathematical disassembly step.

Preferably the mathematical disassembly step includes use of a disassembly key as a parameter in the algorithm which splits the encrypted data item into component parts.

Preferably the disassembly key is a prime number.

Preferably the disassembly key is a symmetric key.

Preferably the data item is stored with reference to a credential.

Preferably the data item is associated with an entity.

Preferably the credential is an entity credential of the entity where the data item is associated with an entity.

Preferably in particular forms the algorithm is irreversible such that the data item character string 16 input into the algorithm 17 cannot be obtained merely having possession of one or other of others of the arguments of the algorithm.

In a further broad form of the invention there is provided a method of securing a data item N; said data item in the form of a data item character string; for secure storage of a representation of the data item; the method comprising the steps of:
  importing the character string comprising the data item into a first environment;
  applying a first function/algorithm having at least a first data item argument to the data item character string thereby to form a first modified data item character string;
  applying a second function/algorithm having at least a second data item argument to the first modified character string whereby the first modified data item character string is embedded in a second modified data item character string; said second modified data item character string in the form of a first data item prime number;
  selecting a second data item prime number different from said first data item prime number;
  defining at least the first data item prime number as a data item private key in respect of the data item; defining the product of the first data item prime number and the second data item prime number as a data item public key in respect of the data item;
  deleting the data item character string from the first environment;
  maintaining a data record associating the first data item prime number, the first function/algorithm and the second function/algorithm whereby the data item can be calculated by supply of arguments to the first function/algorithm and the second function/algorithm.

Preferably an argument is the data item public key.

Preferably an argument is the data item private key.

Preferably an argument is the second data item argument.

Preferably an argument is the first data item argument.

Preferably the second data item argument is the numerical value delta.

Preferably the first data item argument is an ASCII look up table.

Preferably the first function converts the character string into a numeric string.

Preferably the second function/algorithm adds a numerical value delta to the first modified character string in order to form the second modified character string.

Preferably in particular forms the algorithm is irreversible such that the data item character string 16 input into the algorithm 17 cannot be obtained merely having possession of one or other of others of the arguments of the algorithm.

In yet a further broad of the invention there is provided a method of securing a data item N; said data item N represented in the form of a data item character string; for secure storage of at least two representations of the data item and at least two data item arguments; the data item arguments comprising arguments for at least two functions; the at least two functions receiving representations of the data item as input and outputting modified forms of the representations of the data item; the method comprising the steps of:
  importing the data item character string into a first environment;
  applying a first algorithm having at least a first data item argument to the data item character string thereby to form a first modified data item character string;
  applying a second algorithm having at least a second data item argument to the first modified character string thereby to form a second modified data item character string;
  deleting the data item character string from the first environment;
  moving one or more of the first modified data item character string, the second modified data item character string, the first data item argument and the second data item argument to a second environment;
  said second environment at a remote location from said first environment.

Preferably a record is maintained of the data item character string, the first function/algorithm and the second function/algorithm whereby the data item can be calculated by supply of arguments to the first function/algorithm and the second function/algorithm.

Preferably an argument is the data item public key.

Preferably an argument is the data item private key.

Preferably an argument is the second data item argument.

Preferably an argument is the first data item argument.

Preferably the second data item argument is the numerical value delta.

Preferably the first data item argument is an ASCII look up table.

Preferably the first function converts the character string into a numeric string.

Preferably the second function/algorithm adds a numerical value delta to the first modified character string in order to form the second modified character string; whereby the first modified data item character string is embedded in a second modified data item character string; said second modified data item character string in the form of a first data item prime number; selecting a second data item prime number different from said first data item prime number; defining at least the first data item prime number as a data item private key in respect of the data item; defining the product of the first data item prime number and the second data item prime number as a data item public key in respect of the data item.

Preferably an argument is dynamically created immediately prior to its application to an algorithm.

Preferably each secondary argument is dynamically created immediately prior to its application to an algorithm.

Preferably at least some of the secondary arguments are dynamically created immediately prior to their application as am input to an algorithm.

Preferably the algorithms are applied to the data item character string within a first environment 20. In preferred forms, once the algorithms have been applied, one or more of the arguments are stored in a second environment 21.

Preferably at least one of the primary arguments is stored in the second environment. In a preferred for at least one of the primary arguments is stored in the second environment and then deleted from the first environment.

Preferably at least one of the secondary arguments is stored in the second environment. In a preferred form at least one of the secondary arguments is stored in the second environment and then deleted from the first environment.

Preferably at least a first algorithm 14 and a second algorithm 17 is applied consecutively to the data item character string 13. In a preferred form at least one primary argument and at least one secondary argument is stored in the second environment after application of the at least a first algorithm 14 and at least a second algorithm 17 to the data item character string 13.

Preferably the process is repeated N times.

Preferably N equals 2.

Preferably N equals 3.

Preferably N equals 4.

Preferably at least one primary argument and the at least one secondary argument is deleted from the first environment after storage in the second environment.

Preferably the second environment 21 is separated from the first environment 20. In preferred forms the second environment 21 is separated from the first environment 20 by virtue of the second environment being located at a location which is a remote location from the location of the first environment.

Preferably the second environment 21 is logically separated from the first environment 20. Preferably those outputs or arguments which are stored in the second environment are then deleted from the first environment.

Preferably the data item 11 including the data item character string 13 is deleted from the first environment once one or more of the algorithms have been applied.

Preferably the data item 11 including the data item character string 13 is deleted from the first environment once one or more of the algorithms have been applied and once one or more of the outputs of the algorithms or arguments are stored in the second environment 21.

Preferably where it is desired to recover the information 12 that was contained in the data item 11 the above described process is reversed.

Preferably the first step in the reversal is to bring to the one location the outputs of the algorithms or arguments stored in the first environment 20 and the second environment 21.

Preferably the arguments are then applied to the algorithms to reverse the process whereby the data item 11 is recovered for use.

Preferably the above described process is reapplied to the data item 11 after it has been used thereby to secure the information 12 contained in it once more for a potentially indefinite period of time.

Preferably in particular forms the algorithm is irreversible such that the data item character string 16 input into the algorithm 17 cannot be obtained merely having possession of one or other of others of the arguments of the algorithm.

In yet a further broad form of the invention there is provided a method of securing the information in a data item N; said data item N represented in the form of a data item character string; the method comprising the steps of:

importing the data item character string into a first environment;

applying at least a first function/algorithm having at least a first data item primary argument and an at least a first data item secondary argument to the data item character string thereby to form a first modified data item character string; and wherein the least a first data item primary argument comprises the data item character string;

applying a second function/algorithm having at least a second data item primary argument and an at least a second data item secondary argument to the first modified character string thereby to form a second modified data item character string, and wherein the least a second data item primary argument comprises the first modified data item character string;

deleting the data item character string from the first environment;

moving one or more of the arguments to at least a second environment;

said second environment at a remote location from said first environment.

Preferably for the secure storage of at least two representations of the data item and at least two data item arguments; the data item arguments comprising arguments for at least two functions; the at least two functions receiving representations of the data item as input and outputting modified forms of the representations of the data item.

Preferably the arguments comprise one or more of first modified data item character string, the second modified data item character string, the first data item argument and the second data item argument.

Preferably in particular forms the algorithm is irreversible such that the data item character string 16 input into the algorithm 17 cannot be obtained merely having possession of one or other of others of the arguments of the algorithm.

Preferably there is provided a digital input/output device incorporating means to implement the method as described above.

Preferably the device implemented as a software application on a smart phone.

Preferably there is provided a medium storing code thereon which, when executed by a processor, effects the method as described above.

Preferably the medium is a non-transitory medium.

Preferably there is provided a digital input/output device incorporating means to recognize a physiological feature preparatory to transferring the data item in accordance with the method as described above.

Preferably the device implemented as a software application on a smart phone.

In yet a further broad form of the invention there is provided a method of responding to a security incursion in a system having at least a first storage location and a second storage location; the system implementing a method of encrypting and storing a data item; said method comprising:

a. a data encryption step wherein the data item is encrypted to form an encrypted data item;

b. a mathematical disassembly step wherein the encrypted data item is mathematically disassembled into two or more encrypted data item component parts comprising at least a first component part and a second component part;

c. storing at least a one of the component parts at the first storage location and storing the second component part at the second storage location separate from the others of the component parts; said method comprising:

in the event a security incursion is detected at the first location whereby the at least a first component part is compromised deleting the at least a first component part from the first location and deleting the at least a second component part from the second location.

In yet a further broad form of the invention there is provided a distributed encryption system wherein data to be encrypted is:

a. placed on a primary server and then expanded and obfuscated to form an obfuscated string;
b. the obfuscated string is then encrypted using a symmetric encryption key to form an encrypted string;
c. a string of packing data is then progressively added to the encrypted string until resulting data string is computationally equivalent of the nearest prime number which is then defined as the initial prime number;
d. an additional prime number of similar length is generated and the initial prime number and the additional prime number are used to generate a public key using a predetermined public key algorithm.

Preferably the initial prime number is deleted from memory and not stored.

Preferably, resultant components are then stored in disparate locations.

Preferably the symmetric encryption key and the string of packing data are stored on a primary server; the public key is stored on a secondary server; and the additional prime number is stored on a tertiary server.

Preferably when the data is to be decrypted,
a. the public key and additional prime number are retrieved from their respective servers;
b. the public key is used in combination with the additional prime number are used to calculate the initial prime number using the predetermined public key algorithm;
c. the stored string of packing data is then subtracted from the resulting prime number and the resulting encrypted string is decrypted using the symmetric encryption key that was stored on the primary server and;
d. desired target data is de-obfuscated from the resulting expanded obfuscated data string using reverse of obfuscation rules used initially to originally obfuscated the data.

Preferably the system uses any form of public key encryption including but not limited to RSA or Shamir's algorithm.

In yet another broad form of the present invention there is provided a method of data protection, the method comprises the steps:
a. the data to be encrypted is encrypted with a symmetric key;
b. the symmetric key is obfuscated and expanded;
c. then it is encrypted using a second symmetric key that is then stored on a primary server;
d. a string of packing data is then added to the encrypted symmetric key to form a prime number;
e. a second prime number of similar length is generated and the two prime numbers.

Preferably the symmetric encryption key and the string of packing data are stored on a primary server; the public key is stored on a secondary server; and the additional prime number is stored on a tertiary server.

Preferably decryption of the data is performed by reversing the steps.

BRIEF DESCRIPTION OF DRAWINGS

Embodiment of the present invention will now be described with reference to the accompanying drawings wherein.

DETAILED DESCRIPTION OF PREFERRED EMBODIMENTS

Figure 1A:
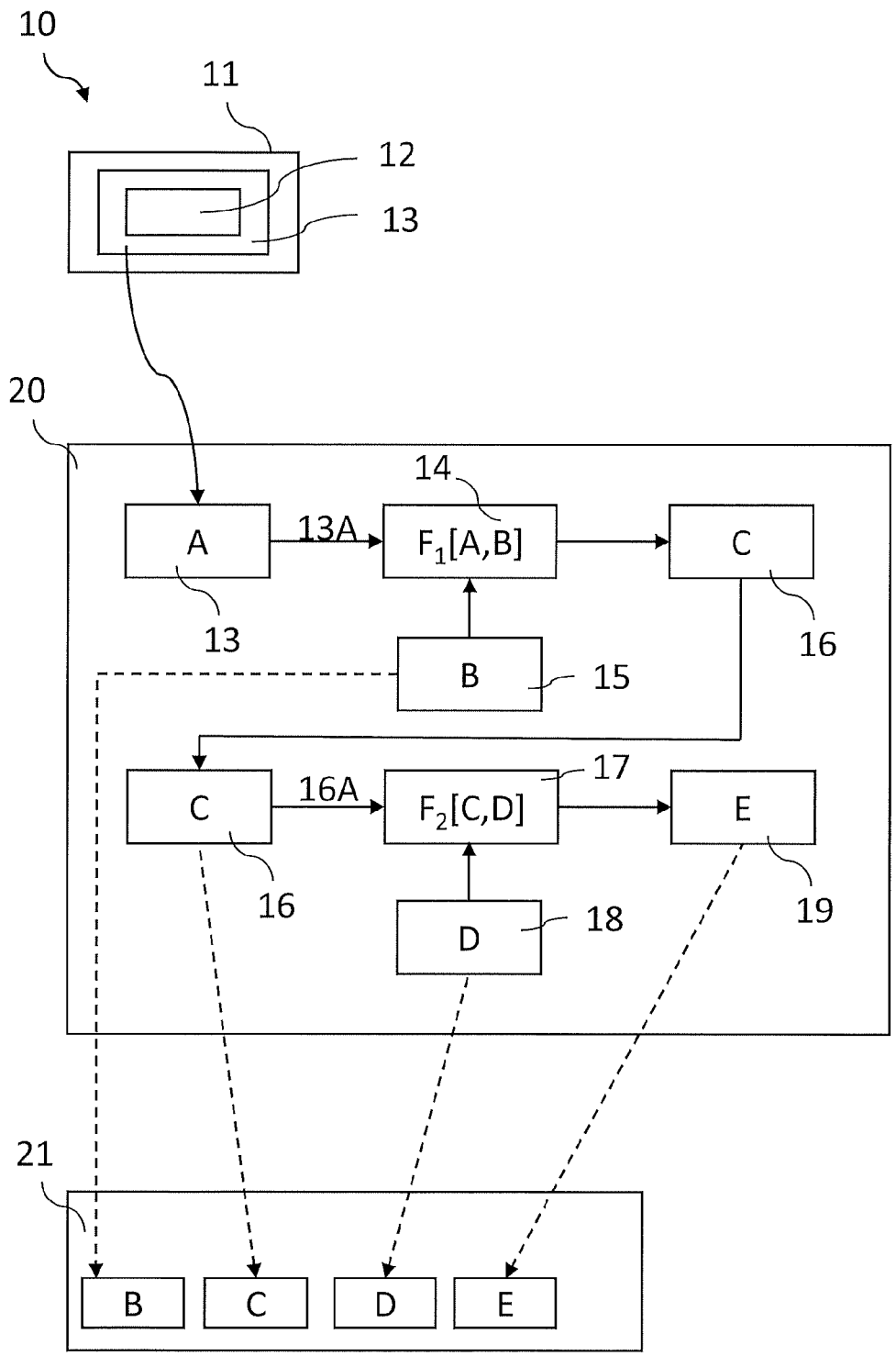
FIGS. 1A, 1B, 1C and 1D are block diagrams of stages of application of a generalized embodiment of the system of the present invention.
Figure 1B:
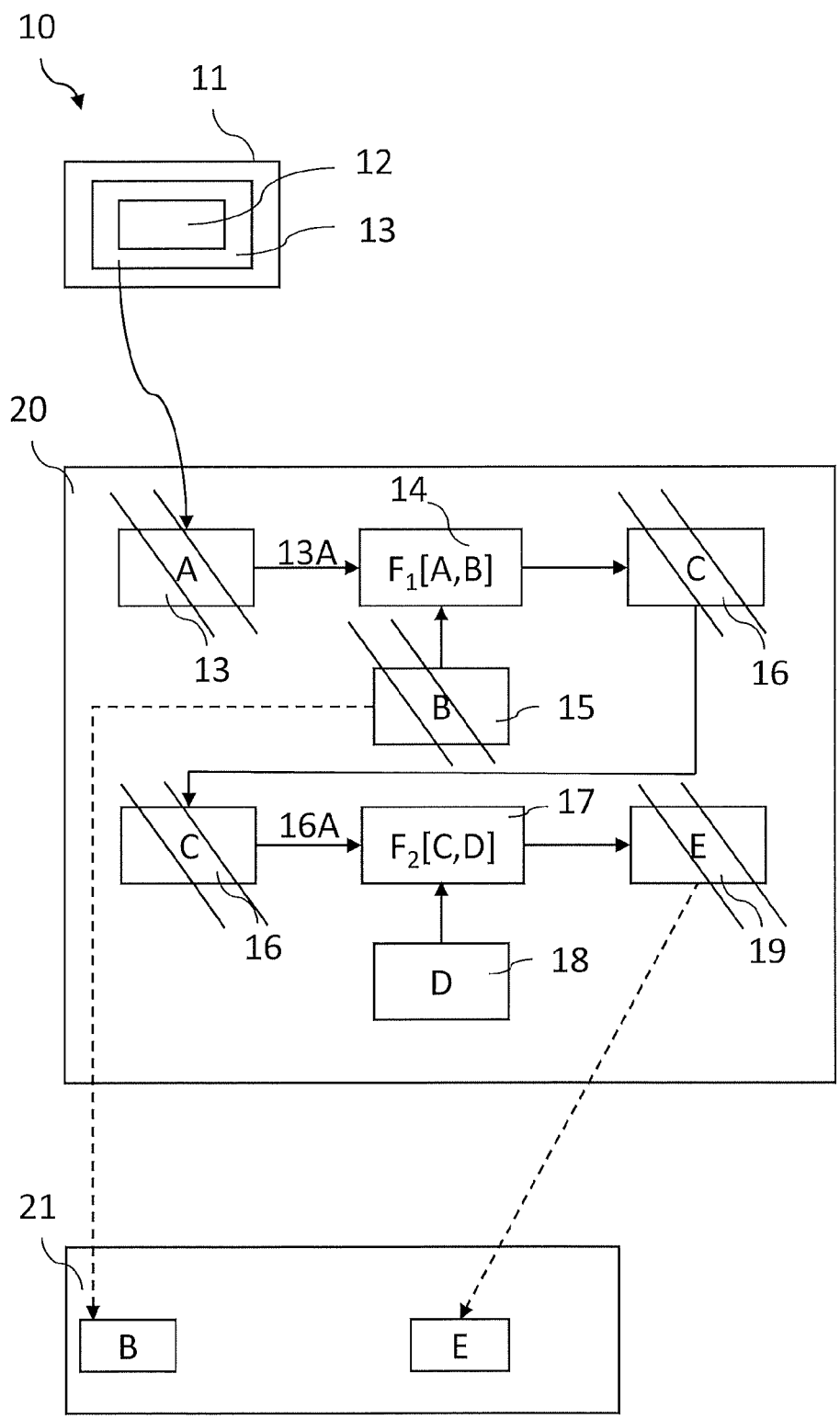
Figure 1C:
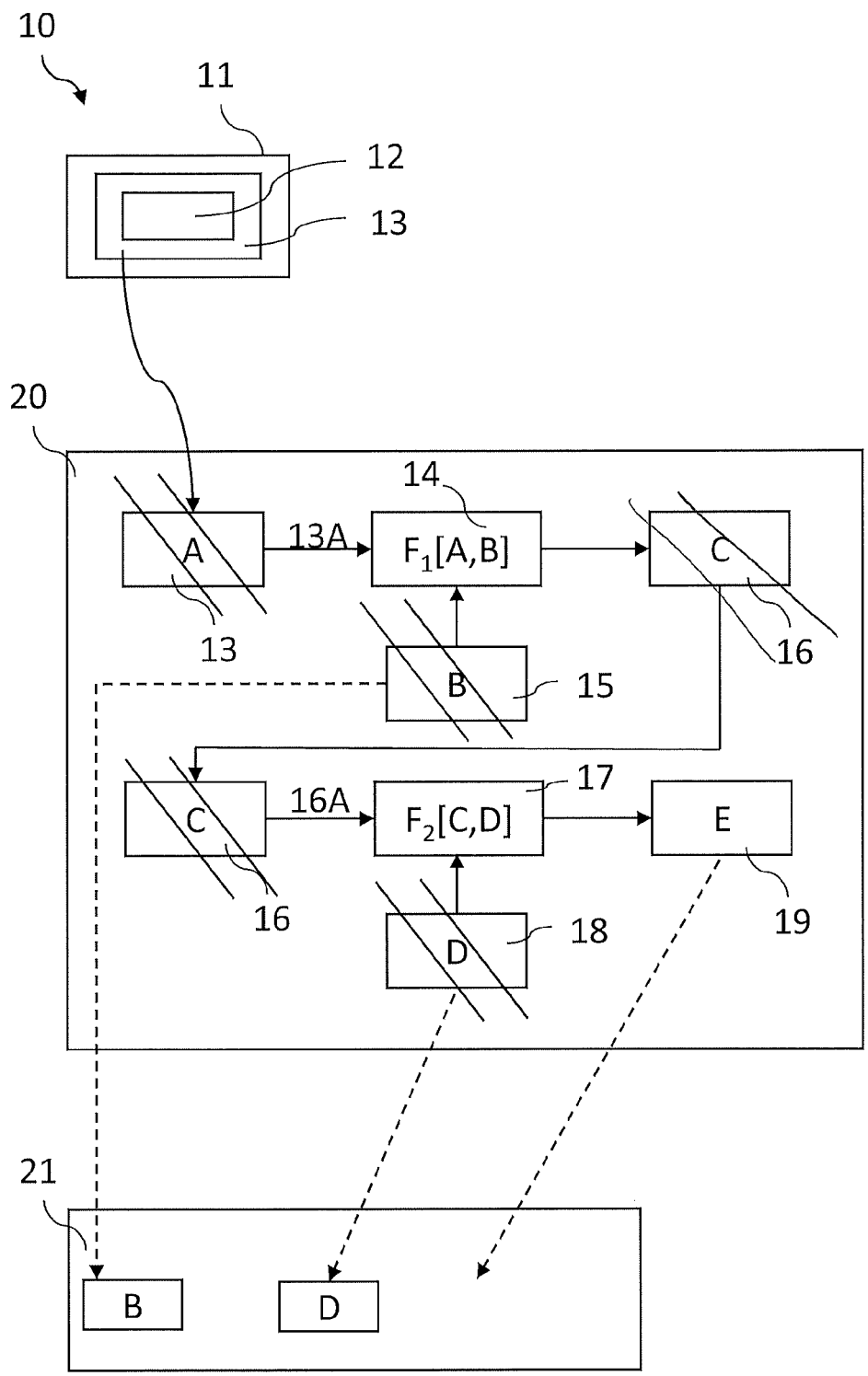

Broadly in one embodiment there is disclosed a method of encrypting and storing a data item; said method comprising:
a data encryption step wherein the data item is encrypted to form an encrypted data item;
a mathematical disassembly step wherein the encrypted data item is mathematically disassembled into two or more encrypted data item component parts comprising at least a first component part and a second component part;
storing at least a one of the component parts at a location separate from the others of the component parts.

In a preferred form the location separation is by logical memory separation whereby the at least a first component part is stored in a first logical memory and the at least a second component part is stored in a second logical memory.

In an alternative preferred form the location separation is by use of separate servers whereby the at least a first component part is stored in a first server and the at least a second component part is stored in a second server.

In a particular preferred form the location separation is by geographic separation whereby the at least a first component part is stored in a first geographic location and the at least a second component part is stored in a second geographic location and wherein the first geographic location is geographically separated from the second geographic location.

In yet a further particular form the location separation is geographic separation of separate servers, each server holding different ones of the component parts forming the encrypted data item.

Broadly in a further embodiment there is disclosed a method of securing a data item N; said data item in the form of a data item character string; for secure storage of a representation of the data item; the method comprising the steps of:
importing the character string comprising the data item into a first environment;
applying a first algorithm having at least a first data item argument to the data item character string thereby to form a first modified data item character string;
applying a second algorithm having at least a second data item argument to the first modified character string whereby the first modified data item character string is embedded in a second modified data item character string; said second modified data item character string in the form of a first data item prime number;
selecting a second data item prime number different from said first data item prime number;

defining at least the first data item prime number as a data item private key in respect of the data item; defining the product of the first data item prime number and the second data item prime number as a data item public key in respect of the data item;

deleting the data item character string from the first environment;

maintaining a data record associating the first data item prime number, the first algorithm and the second algorithm whereby the data item can be calculated by supply of arguments to the first algorithm and the second algorithm.

In a preferred form an argument is the data item public key.

In alternative preferred form an argument is the data item private key.

In an alternative preferred form an argument is the second data item argument.

In an alternative preferred form an argument is the first data item argument.

In an alternative preferred form the second data item argument is the numerical value delta.

In an alternative preferred form the first data item argument is an ASCII look up table.

In an alternative preferred form the first algorithm converts the character string into a numeric string.

In an alternative preferred form the second algorithm adds a numerical value delta to the first modified character string in order to form the second modified character string.

In a particular preferred form the second environment 21 is separated from the first environment 20 by virtue of the second environment being located at a location which is a remote location from the location of the first environment.

In a further particular preferred form the second environment 21 is logically separated from the first environment 20.

With reference to FIGS. 1A, 1B, 1C and 1D preferred embodiments of the system 10 of the present invention seek to secure a data item 11 for secure storage of the information 12 contained in the data item 11.

In preferred forms the data item 11 is in the form of a data item character string 13. In preferred forms at least a first algorithm 14 is applied to the data item character string 13 thereby to produce a first modified data item character string 16 as an output of the at least a first algorithm 14. Preferably the first algorithm 14 is in the form of a mathematical function having at least a first data item primary argument 13A and having at least a first data item secondary argument 15. In preferred forms the first data item primary argument 13A is the data item character string 13.

In preferred forms at least a second algorithm 17 is applied to the data item character string 13 thereby to produce a second modified data item character string 19 as an output of the at least a second algorithm 17. Preferably the second algorithm 17 is in the form of a mathematical function having at least a second data item primary argument 16A and having at least a second data item secondary argument 18. In preferred forms the second data item primary argument 16A is the first modified data item character string 16, (which is to say the data item character string 13 after it has been modified by application of an algorithm previous to application of the at least a second algorithm 17). In this instance it has been modified by application of the at least a first algorithm 14 applied to the data item character string 13.

In preferred forms an argument is dynamically created immediately prior to its application to an algorithm.

In preferred forms each secondary argument is dynamically created immediately prior to its application to an algorithm.

In preferred forms at least some of the secondary arguments are dynamically created immediately prior to their application as an input to an algorithm.

In a preferred form the algorithms are applied to the data item character string within a first environment 20. In preferred forms, once the algorithms have been applied, one or more of the arguments are stored in a second environment 21.

In a preferred form at least one of the primary arguments is stored in the second environment. In a preferred form at least one of the primary arguments is stored in the second environment and then deleted from the first environment.

In a preferred form at least one of the secondary arguments is stored in the second environment. In a preferred form at least one of the secondary arguments is stored in the second environment and then deleted from the first environment.

In a preferred form at least a first algorithm 14 and a second algorithm 17 is applied consecutively to the data item character string 13. In a preferred form at least one primary argument and at least one secondary argument is stored in the second environment after application of the at least a first algorithm 14 and at least a second algorithm 17 to the data item character string 13.

The process described immediately above may be repeated.

In a preferred form the at least one primary argument and the at least one secondary argument is deleted from the first environment after storage in the second environment.

In preferred forms the second environment 21 is separated from the first environment 20. In preferred forms the second environment 21 is separated from the first environment by virtue of the second environment being located at a location which is a remote location from the location of the first environment.

In preferred forms the second environment 21 is logically separated from the first environment 20. Preferably those outputs or arguments which are stored in the second environment are then deleted from the first environment.

Preferably the data item 11 including the data item character string 13 is deleted from the first environment once one or more of the algorithms have been applied.

Preferably the data item 11 including the data item character string 13 is deleted from the first environment once one or more of the algorithms have been applied and once one or more of the outputs of the algorithms or arguments are stored in the second environment 21.

When it is desired to recover the information 12 that was contained in the data item 11 the above described process is reversed. The first step in the reversal is to bring to the one location the outputs of the algorithms or arguments stored in the first environment 20 and the second environment 21. The arguments are then applied to the algorithms to reverse the process whereby the data item 11 is recovered for use.

In some embodiments the above described process is reapplied to the data item 11 after it has been used thereby to secure the information 12 contained in it once more for a potentially indefinite period of time.

It is to be noted that embodiments to be described are not merely a higher level of encryption with the 'keys' distributed. The data is deconstructed and recreated using algorithms that require several stored pieces of segregated information to be brought together before the algorithms can be processed.

Figure 1D:
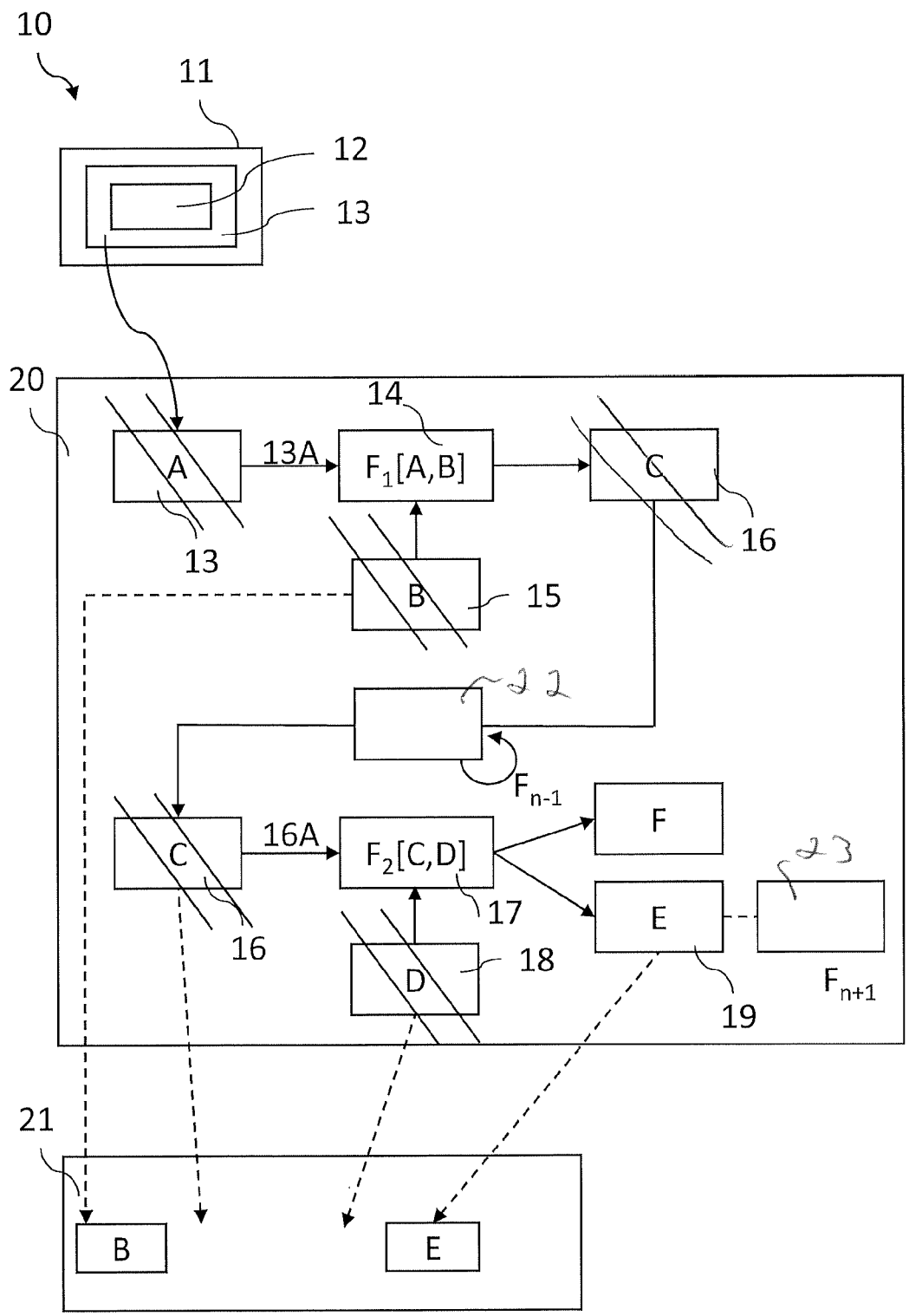

With reference to FIG. 1D any given algorithm 14, 17 may produce more than one output, in this instance outputs E, F. This may result depending on the nature of the algorithm utilized. The second embodiment described below included application of Shamir's algorithm which can produce this form of output.

In particular forms the algorithm is such that the data item character string 16 input into the algorithm 17 cannot be obtained merely having possession of one or other of E or F or D.

In the examples given a first and a second algorithm are applied. Additional algorithms may be applied to form a longer sequence as indicated by additional algorithms 22, 23 in FIG. 1D.

First Preferred Embodiment

Figure 2:
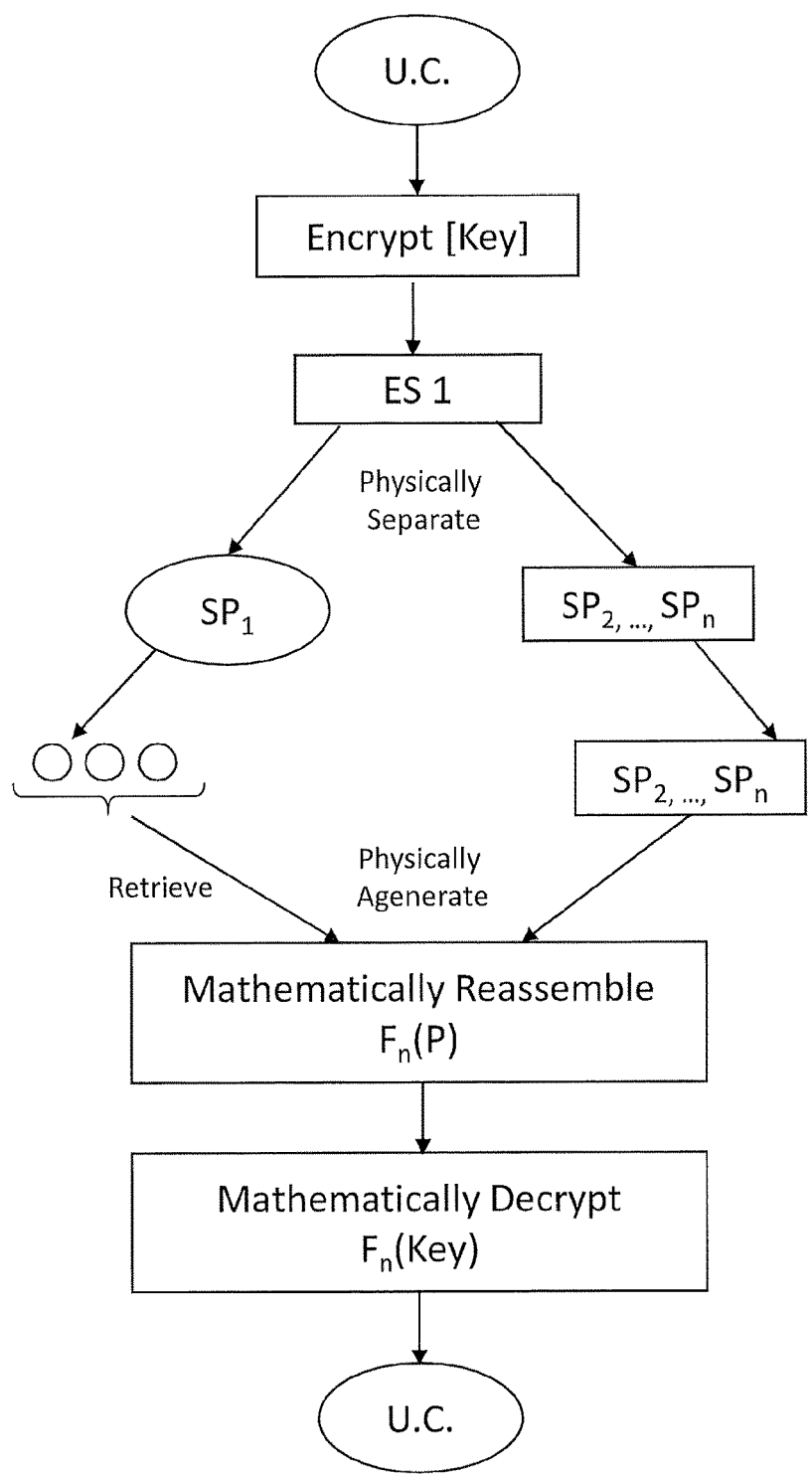
FIG. 2 is a flowchart of the steps to perform at least a first embodiment of the system of the present invention.

With reference to FIG. 2 there is disclosed a flow chart of a method of securing a data item in accordance with a first preferred embodiment; said data item in the form of a data item character string; for secure storage of a representation of the data item; the method comprising the steps of:
  importing the character string comprising the data item into a first environment;
  applying a first function/algorithm having at least a first data item argument to the data item character string thereby to form a first modified data item character string;
  applying a second function/algorithm having at least a second data item argument to the first modified character string whereby the first modified data item character string is embedded in a second modified data item character string; said second modified data item character string in the form of a first data item prime number;
  selecting a second data item prime number different from said first data item prime number;
  defining at least the first data item prime number as a data item private key in respect of the data item; defining the product of the first data item prime number and the second data item prime number as a data item public key in respect of the data item;
  deleting the data item character string from the first environment;
  maintaining a data record associating the first data item prime number, the first function/algorithm and the second function/algorithm whereby the data item can be calculated by supply of arguments to the first function/algorithm and the second function/algorithm.

Preferably an argument is the data item public key.
Preferably an argument is the data item private key.
Preferably an argument is the second data item argument.
Preferably an argument is the first data item argument.
Preferably the second data item argument is the numerical value delta.
Preferably the first data item argument is an ASCII look up table.
Preferably the first function converts the character string into a numeric string.
Preferably the second function/algorithm adds a numerical value delta to the first modified character string in order to form the second modified character string.

Figure 3:
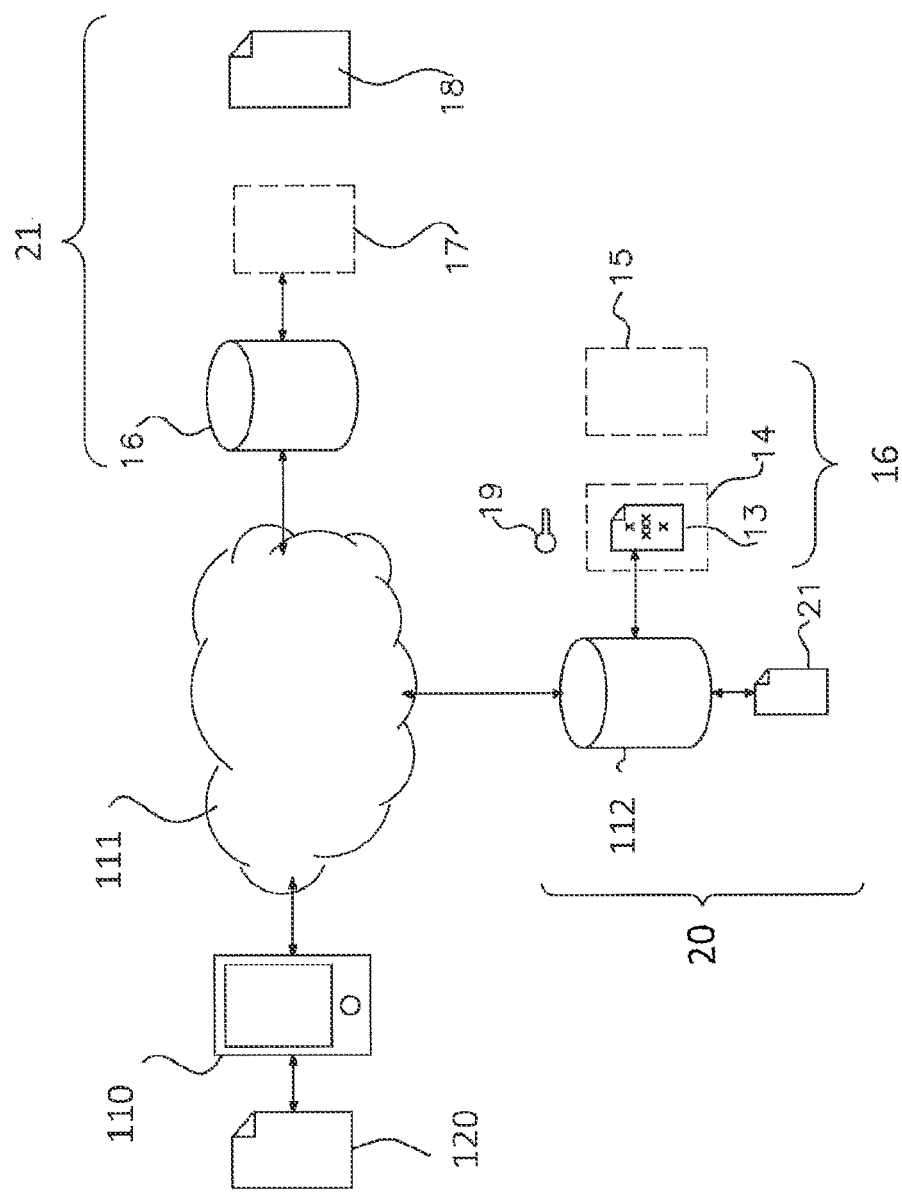
FIG. 3 is a block diagram of the main components suitable to implement the steps of the first embodiment of figure for storage and subsequent retrieval of a data item in accordance with the system of the present invention.

With reference to FIG. 3 there is disclosed an implementation of the first preferred embodiment. Typically data in the form a data item character string 120 to be secured comes from a source such as a client device 110 and arrives at a first environment 20 in this instance in the form of a main process server 112 by means of a public network such as the Internet 111. The main process server 112 then, in a preferred form, encrypts the data item character string 120 to form encrypted data item character string 113. A first algorithm 14 is then applied to the encrypted data item character string 113. The first algorithm 14 finds the next available prime number 114 numerically next above the numerical value of the encrypted data item character string 113. First algorithm 14 outputs this prime number 114 as first modified data item character string 16. In this instance the first algorithm 14 has been used to obfuscate the encrypted data item character string 113. Next a complimentary prime number 15 is generated using a public key algorithm that is known in the art.

The secondary prime number 15 and the encryption key 19 that was used to encrypt the data to be protected 13 are stored on the main process server 12. The initial prime number 14 and the secondary prime number 15 are combined to produce a public key using public key techniques known in the art and is then stored 17 on a remote server 16 along with the differential 18 between the encrypted data 13 and the initial prime number 14.

After the storage of the components 17 18 on the secondary server 16 are confirmed, the original encrypted data 13 encased in a prime number 14 are deleted from memory.

When a request is made to decrypt the protected data, the secondary server 16 is used to send the public key 17 along with the differential 18 to the primary server 12 to be de-obfuscated and decrypted. At the primary server 12 the stored prime number 15 is applied to the public key 17 to retrieve the initial prime number 14. The differential 18 is then applied to the initial prime number 14 resulting in the encrypted original data set 13. The locally stored encryption key 19 is then used to decrypt the protected data to its unencrypted state 21.

In the example embodiment the main server is used for storing the encryption key of the data to be protected as well as the secondary prime number that is later used in the deobfuscation process. A second server is used to store a public key generated from the initial prime number and the secondary prime number as well as the differential between the first prime number and the data in its encrypted state. An alternative embodiment could see any of the key components stored at any accessible location on any number of remote servers as long as the components can be retrieved.

Second Preferred Embodiment

Figure 4:
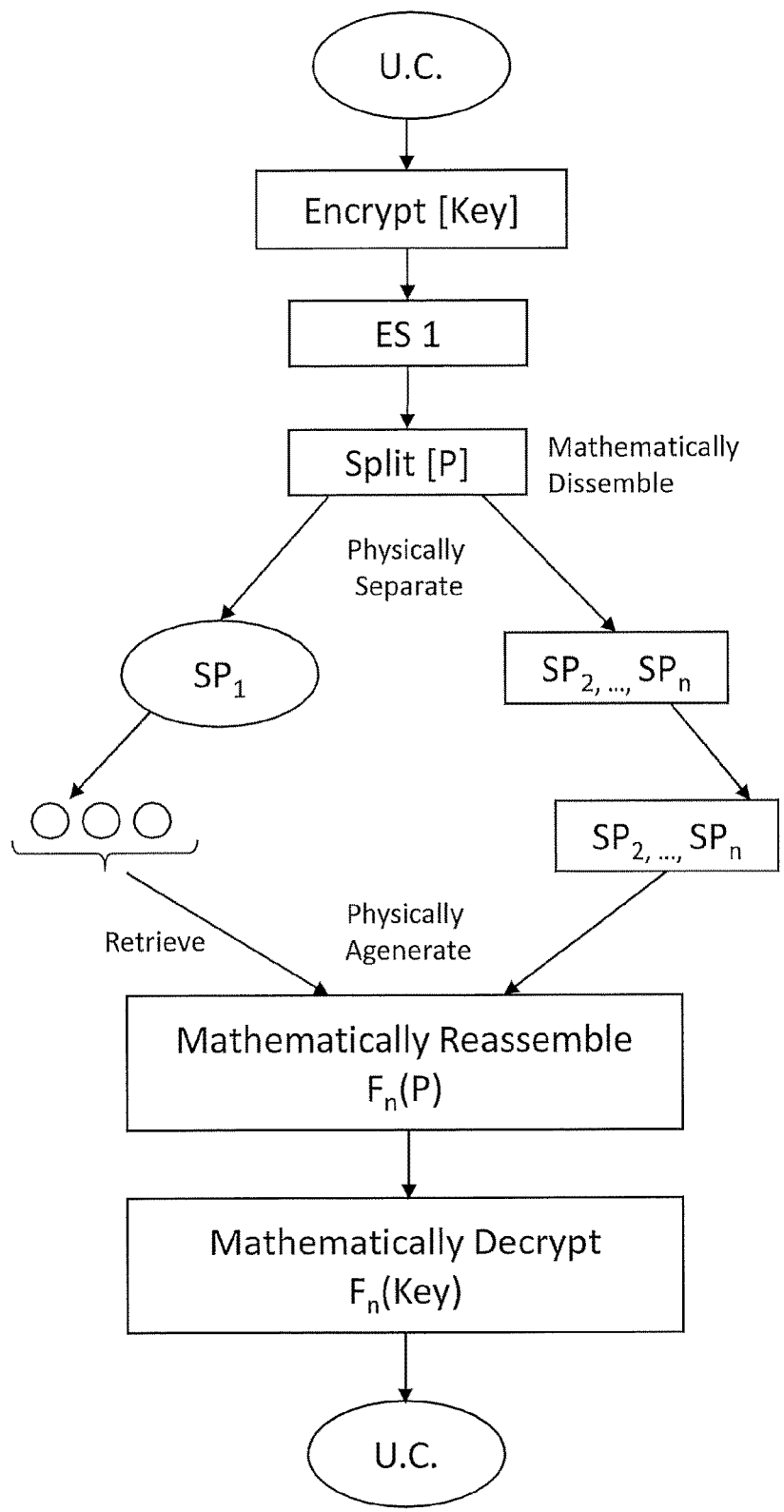
FIG. 4 is a flowchart of the steps to perform at least a second embodiment of the system of the present invention.

With reference to FIG. 4 there is shown a flowchart of the steps to perform at least a second embodiment of the system of the present invention. The detailed steps of implementation are further illustrated in FIGS. 5 and 6.

It is important to note that the later solution is not merely a higher level of encryption with the 'keys' distributed, the data is deconstructed and recreated using algorithms that requires several stored pieces of segregated information to be brought together before the algorithms can be processed.

The example embodiment uses public key encryption techniques to obfuscate and allow the secure distribution of key components for later recompilation and decryption. An alternative embodiment could use a nonpublic key encryption system such as Shamir's Secret Sharing algorithm which is known in the art. In this alternative embodiment the encrypted data still has a prime number applied to it however rather than generating a secondary prime number using public key methods the prime number is applied as a salt to the encrypted data to produce random points on a mathematical line. In this model at least two locations are required to distribute the random points. So the locations are stored on separate servers and the salt is stored on one of the servers. In yet another alternate embodiment an indefinite number of random points can be stored on an indefinite number of locations.

Example 1—Small Data Encryption

Figure 5:
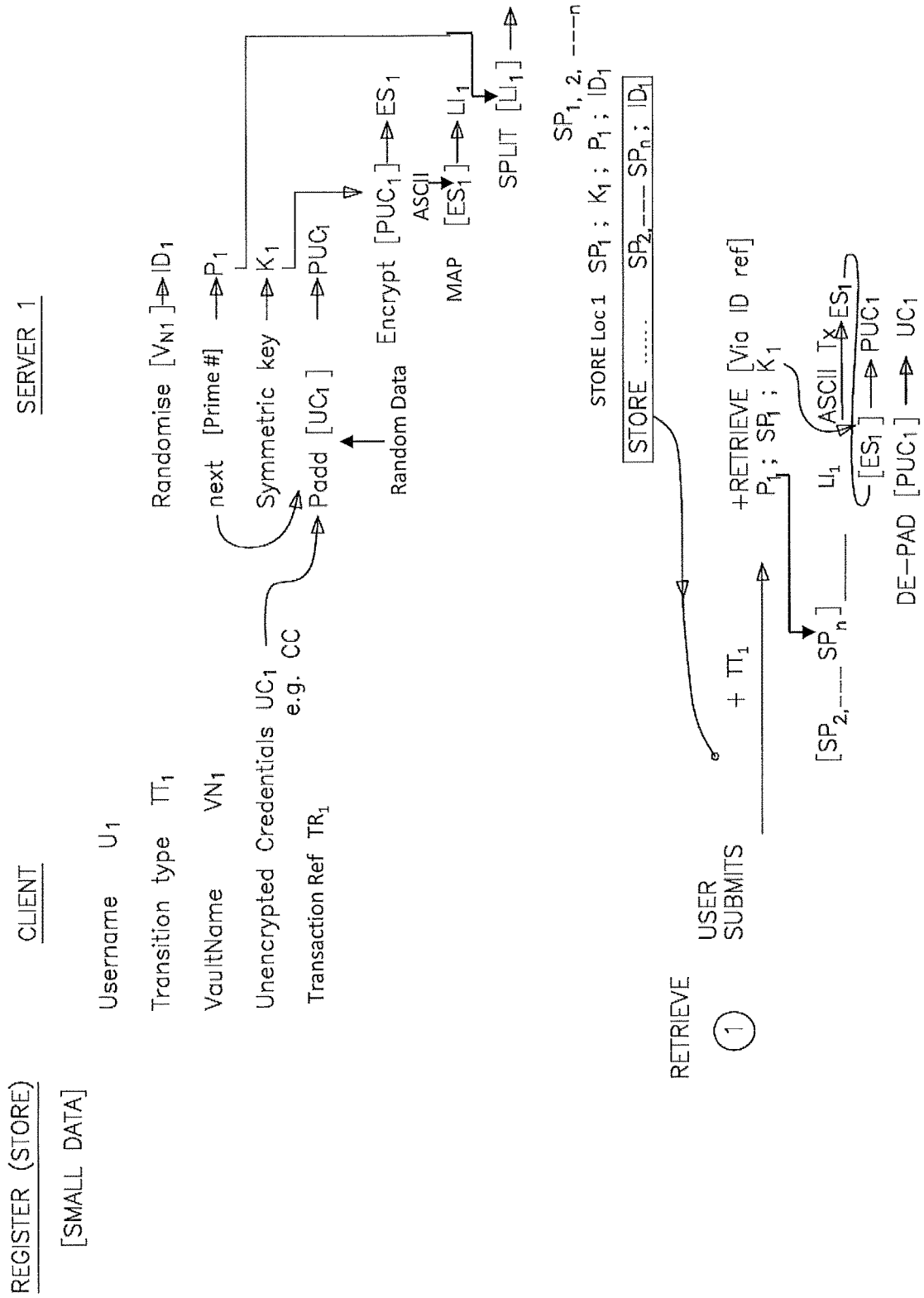
FIG. 5 is a process diagram outlining the steps for storage and retrieval of at least one example of the second embodiment of FIG. 4 wherein the data item comprises a short data string.

With reference to FIG. 5: small data encryption method is used when the data to be encrypted is of less than 200 chars in length. This number was chosen to allow for sufficient random padding of the data before encryption and to also ensure that the generated prime number is not too large that it has an impact on creation time.

To create encrypted distributed secure data:

The user will enter data items 11 including a username (U1), vault name (VN1) unencrypted credentials (UC1) (e.g. a credit card number), transaction type (TT1) and transaction reference (TR1), at least one of which data items 11 includes information 12 which is to be secured. In this instance the information 12 is within the unencrypted credentials 13 (UC1).

The system will generate one or more arguments 15, 18 in this instance including a random vault ID (ID1), prime number (P1) and symmetric key (K1) at least some of which will be used as arguments for at least a first and a second algorithms or functions 14, 17 operating consecutively on the information 12.

The system will execute algorithms or functions 14, 17 in a predetermined order, in this instance comprising firstly padding the unencrypted credentials 13 (UC1) with random data (as argument), to create padded unencrypted credentials (PUC1).

The system will then apply at least a second algorithm 17 in this instance an encryption algorithm in order to encrypt the padded unencrypted credentials (PUC1) with the at least second data item argument 18 in this instance in the form of the symmetric key (K1) to create an encrypted string (ES1).

In this instance a yet further function or algorithm is applied whereby the encrypted string (ES1) will be converted or mapped to a large integer (LI1) via ASCII translation table (used as argument to the mapping function).

In this instance a yet further function or algorithm is applied whereby the system will use the prime number (P1) as argument and an algorithm to split the large integer (LI1) into two or more parts (SP1 . . . n). In one form the function is based on Shamir's algorithm.

The system will then separate one or more of the arguments and outputs of the functions or algorithms into separate remote locations. In this particular instance the system will store the vault ID (ID1), the first part (SP1) and the symmetric key (K1) and Prime number (P1) within the database store.

The system will return the ID (ID1), the remaining parts (SP2 . . . n) to a different location.

To retrieve data from the encrypted distributed system:

The user will submit the ID (ID1), the transaction type (TT1), the parts (SP2 . . . n)

The system will retrieve the prime number 1 (P1), part 1 (SP1) and the symmetric key (K1) via the user supplied vault ID (ID1)

The system will use (P1) and the parts (SP1 . . . n) to rebuild the large integer (LI1)

The large integer (LI1) will be converted to the encrypted string (ES1) via ASCII translation table The system will decrypt to the padded unencrypted credentials (PUC1) with the symmetric key (K1)

The system will remove the padding to produce the unencrypted credentials (UC1)

The system will check the transaction type (TT1) to determine if another offline vault should be generated The unencrypted credentials (UC1) will be returned to the user, along with another offline vault if applicable.

Example 2—Large Data Encryption

Figure 6:
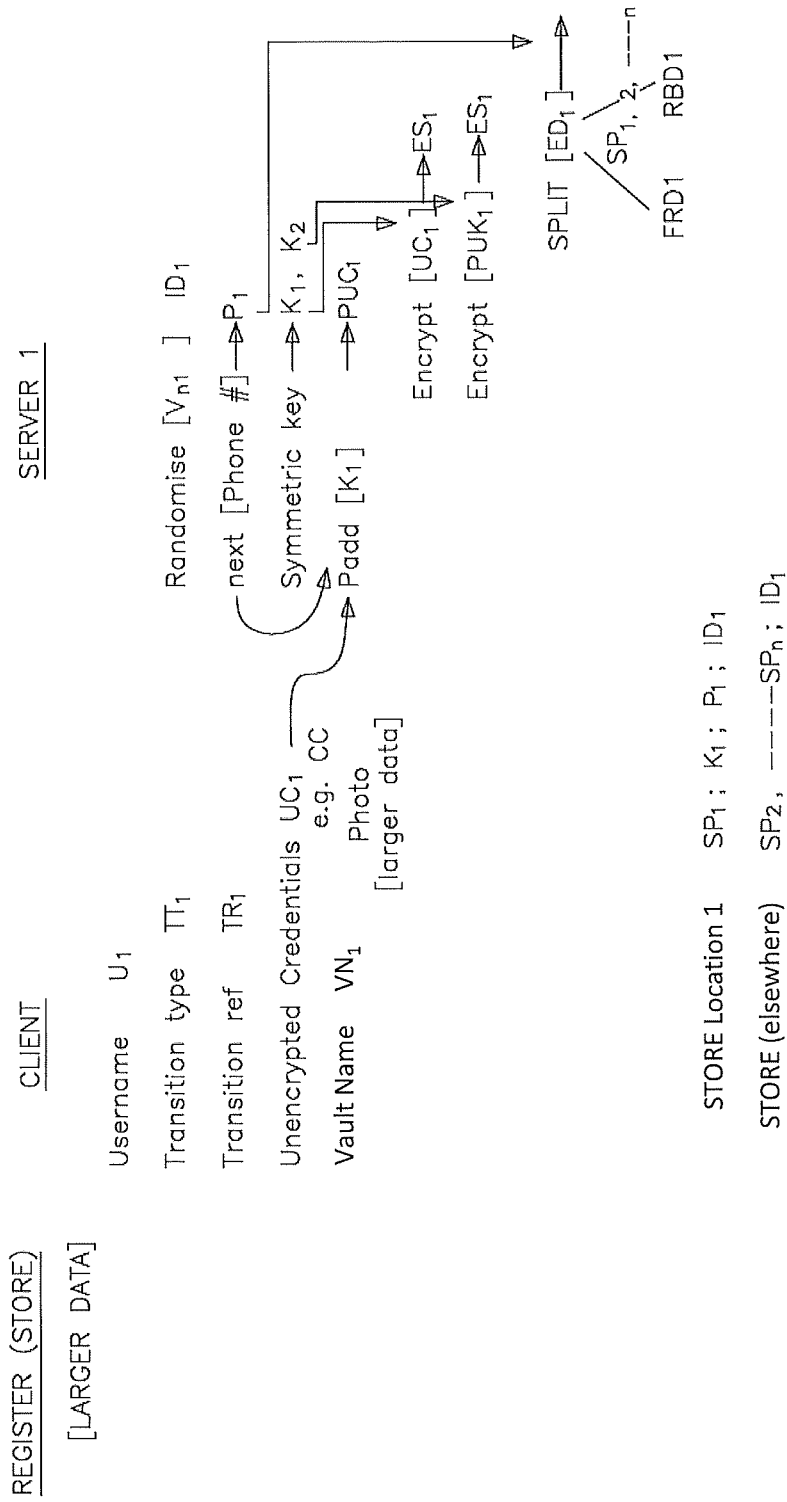
FIG. 6 is a process diagram outlining the steps for storage and retrieval of at least one example of the second embodiment of FIG. 4 wherein the data item comprises a long data string

With reference to FIG. 6: large data encryption method is used when the data to be encrypted is of more that our 200 chars in length. The system automatically determines which method to use based on the passed unencrypted credentials.

To create encrypted distributed secure data:

The user will enter a username (U1), vault name (VN1) unencrypted credentials (UC1) (e.g. a photo), transaction type (TT1) and transaction reference (TR1)

The system will generate a random vault ID (ID1), prime number (P1), two symmetric keys (K1) (K2)

The system will determine that the unencrypted credentials (UC1) are of a large type.

The system will encrypt the unencrypted credentials (UC1) with the symmetric key (K1) to create encrypted data (ED1)

The system splits encrypted data (ED1) into two parts taking the first 100 bytes (FBD1) and remaining (RBD1)

The system will pad the symmetric key (K1) with random data, to create padded unencrypted key (PUK1)

The system will encrypt the padded unencrypted key (PUK1) with the symmetric key (K2) to create an encrypted string (ES1)

The encrypted string (ES1) will be converted to a large integer (LI1) via ASCII translation table The system will use the prime number (P1) and an algorithm to split the large integer (LI1) into two or more parts (SP1 . . . n)

The system will store the vault ID (ID1), the first part (SP1) and the symmetric key (K2), Prime number (P1) and remaining data bytes (RBD1) within the database store The system will return the vault ID (ID1), the remaining parts (SP2 . . . n), and the first bytes of data (FBD1)

To retrieve data from the encrypted distributed system:

The user will submit the vault ID (ID1), the transaction type (TT1), the parts (SP2 . . . n), and the first bytes of data (FBD1)

The system will retrieve the prime number 1 (P1), part 1 (SP1), the symmetric key (K2) and remaining data bytes (RBD1) via the user supplied vault ID (ID1)

The system will use (P1) and the parts (SP1 . . . n) to rebuild the large integer (LI1)

The large integer (LI1) will be converted to the encrypted string (ES1) via ASCII translation table The system will decrypt to the padded unencrypted key (PUK1) with the symmetric key (K2)

The system will remove the padding to produce the unencrypted Key (K1)

The system will merge the first bytes of data (FBD1) with the remaining bytes of data (RBD1) to create encrypted data (ED1)

The system will use unencrypted key (K1) on encrypted data (ED1) to produce unencrypted credentials (UC1)

The system will check the transaction type (TT1) to determine if another offline vault should be generated The unencrypted credentials (UC1) will be returned to the user, along with another offline vault if applicable.

In Use

Figure 7:
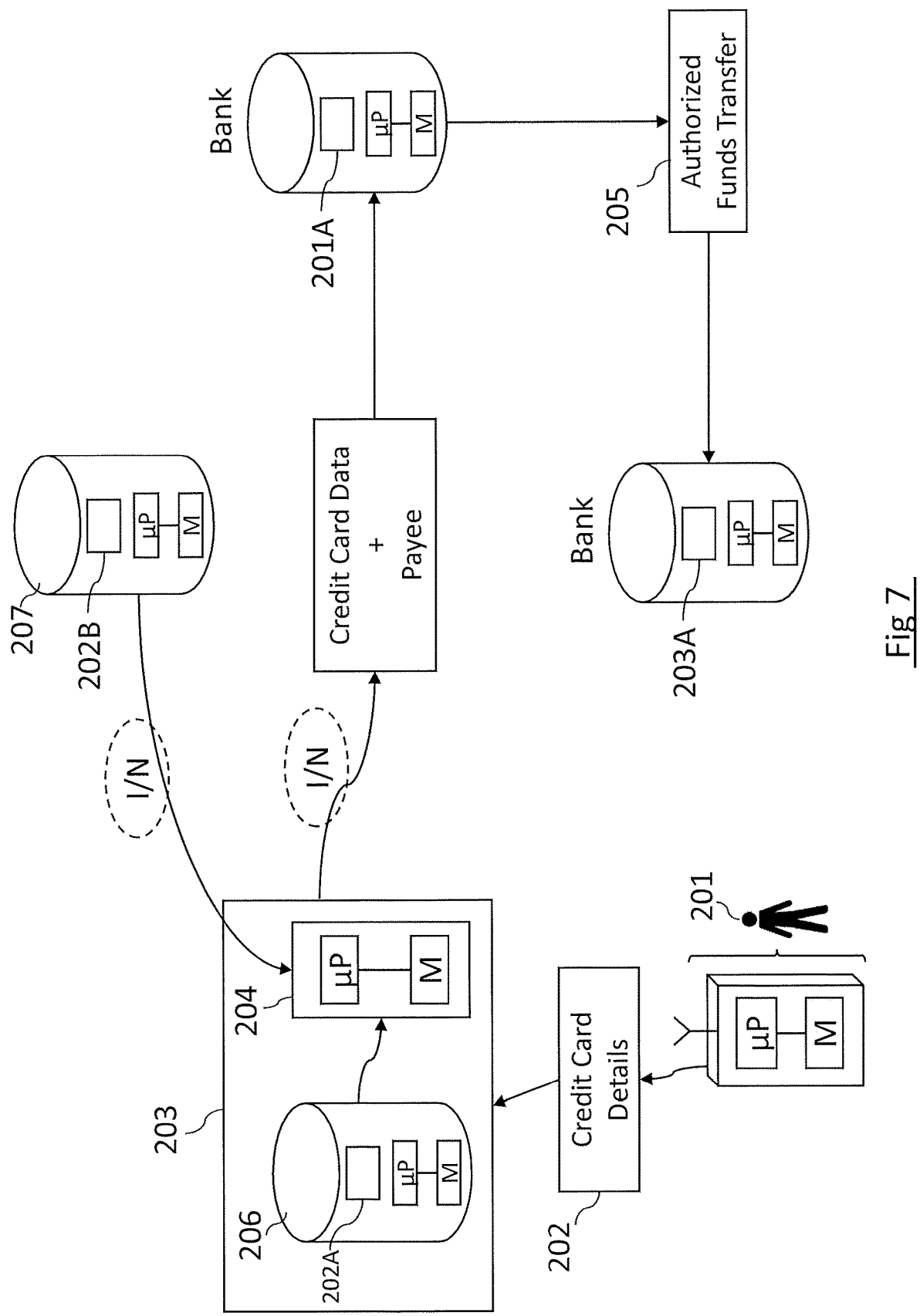
FIG. 7 is a block system diagram of a use scenario applicable to any of the embodiments of the system.

FIG. 7 is a block system diagram of a use scenario applicable to any of the embodiments of the system.

In this instance a user 201 provides credit card details 202 to an entity 203 for the purpose of receiving goods or services. In the instance where the entity 203 may require access to the credit card details 202 again or at some future time the entity 203 may enlist the system 10 of the present application to secure the credit card details 202. In order to do this, the entity 203 may cause the credit card details 202 to be subject to the algorithms 14, 17 and securing process of one or more of the above described embodiments thereby to cause arguments 202A and 202B to be stored in separate locations 206 and 207 respectively. The credit card details 202 may be entirely deleted once the securing process is completed.

In the event the entity 203 wishes to recover the credit card details 202 in order to, for example, make use of them to trigger a periodic payment to entity 203 authorized by user 201 the entity 203 causes the arguments 202A and 202B to be brought into a computing environment 204 whereby the credit card details 202 are recreated and, in this instance, caused to trigger an offline or 'card not present' transaction at the computing environment 204 whereby funds 205 are caused to be transferred from a user account 201A to the entity account 203A.

In some instances, the computing environment 204 may be an environment 206, 207 in which the arguments 202A or 202B have been stored. In an alternative form the computing environment 204 may be an entirely separate environment. In one example the entirely separate environment may be an EFTPOS terminal. In an alternative form computing environment 204 may be a distributed computing environment.

Action in the Event of Breach of an Environment

In the event it is determined that an environment has become compromised—for example if it is determined that unauthorized access has been obtained to arguments 202A in environment 206 or arguments 202B in environment 207 a preferred procedure is to instigate deletion of the arguments in environment which has not been determined as compromised. In this way it becomes exceedingly difficult to reconstruct the credit card details 202 from only the arguments from the compromised environment.

In particular forms the algorithms 14, 17 may be selected such that the arguments output by the algorithms in no circumstance can be reversed without the corresponding secondary argument.

Alternative Embodiments

In the example embodiment the source of the data to be encrypted is a client device e.g. mobile phone. In an alternative embodiment the source data could come from anywhere.

In all of these alternative embodiments additional padding of the initial data can be used to further expand obfuscation options.

In the alternative embodiments already described the data to be protected is typically less than 300 bytes. The generation of prime numbers of this size is relative easy but becomes harder as the size of the data increases beyond this. An alternative embodiment could apply the processes already described to a subset of the initial encrypted data. Ideally the subset would be of a size and location in the data that would make it just as laborious as a brute force attack.

In yet another alternative embodiment a large data chunk could be broken up into multiple parts and have the same technique applied.

The invention claimed is:

1. A method of securing a data item N; said data item in the form of a data item character string; for secure storage of a representation of the data item; the method comprising the steps of:
    a. importing receiving, from a client device via a communication network, the character string comprising the data item at a first server, wherein the data item comprises transaction information corresponding to a transaction associated with a user of the client device;
    b. applying a first algorithm having at least a first data item argument to the data item character string thereby to form a first modified data item character string;
    c. applying a second algorithm having at least a second data item argument to the first modified character string whereby the first modified data item character string is embedded in a second modified data item character string; said second modified data item character string in the form of a first data item prime number;
    d. selecting a second data item prime number different from said first data item prime number;
    e. defining at least the first data item prime number as a data item private key in respect of the data item; defining the product of the first data item prime number and the second data item prime number as a data item public key in respect of the data item, wherein the data item public key is stored on a second server;
    f. deleting the data item character string from the first server;
    g. maintaining, at the first server, a data record associating the first data item prime number, the first algorithm and the second algorithm whereby the data item can be calculated by supply of arguments to the first algorithm and the second algorithm.

2. The method of claim 1 wherein an argument is the data item public key.

3. The method of claim 1 wherein an argument is the data item private key.

4. The method of claim 1 wherein an argument is the second data item argument.

5. The method of claim 1 wherein an argument is the first data item argument.

6. The method of claim 4 wherein the second data item argument is the numerical value delta.

7. The method of claim 5 wherein the first data item argument is an ASCII look up table.

8. The method of claim 1 wherein the first algorithm converts the character string into a numeric string.

9. The method of claim 1 wherein the second algorithm adds a numerical value delta to the first modified character string in order to form the second modified character string.

10. The method of claim 1 wherein in particular forms the algorithm is irreversible such that the data item character string 16 input into the algorithm 17 cannot be obtained merely having possession of one or other of others of the arguments of the algorithm.

11. A distributed encryption system comprising at least a primary server and a secondary server, wherein the system is configured to at least:
    primary server, from a client device via a communication network, a data item comprising transaction information corresponding to a transaction associated with a user of the client device;

expand and obfuscate the data item to form an obfuscated string;
encrypt the obfuscated string using a symmetric encryption key to form an encrypted string;
progressively add a string of packing data to the encrypted string until a resulting data string is computationally equivalent of a nearest prime number which is then defined as an initial prime number;
generate an additional prime number of similar length and use the initial prime number and the additional prime number to generate a public key using a predetermined public key algorithm
store at least a first one of the symmetric encryption key and, the string of packing data, the public key, and the additional prime number at the primary server and store at least a second one of the symmetric encryption key and, the string of packing data, the public key, and the additional prime number at a secondary server.

12. The distributed encryption system of claim 11 wherein the initial prime number is deleted from memory and not stored.

13. The distributed encryption system of claim 11, wherein the symmetric encryption key and the string of packing data are stored on the primary server; the public key is stored on the secondary server; and the additional prime number is stored on a tertiary server.

14. The distributed encryption system of claim 11 wherein when the data is to be decrypted,
   a. the public key and additional prime number are retrieved from their respective servers;
   b. the public key is used in combination with the additional prime number are used to calculate the initial prime number using the predetermined public key algorithm;
   c. the stored string of packing data is then subtracted from the resulting prime number and the resulting encrypted string is decrypted using the symmetric encryption key that was stored on the primary server and;
   d. desired target data is de-obfuscated from the resulting expanded obfuscated data string using reverse of obfuscation rules used initially to originally obfuscated the data.

15. A data encryption system
memory storing computer-executable instructions that cause the one or more processors to at least:
receive a data string from a client device via a communication network, the data string comprising transaction information corresponding to a transaction associated with a user of the client device;
encrypt the data string using an encryption key in order to produce an encrypted data string;
pad the encrypted data string to expand the encrypted data string so as to produce a nearest prime number to the encrypted data string; and
select a second similar length prime number so as to create a private key pair; the product of the private key pair producing a public key; and
storing at least two of the public key, the second prime number of the key pair, the padding data, and the encryption key at different locations selected from the plurality of servers.

16. The system of claim 15 wherein the public key and the second prime number of the private key pair are stored separately as well as the padding data and the encryption key.

17. The system of claim 16 wherein the individual components would be stored in separate locations.

18. The system of claim 15 wherein never would all of the components be stored in the same location.

19. The system of claim 15 wherein the components must be stored in a minimum of two locations but the more different locations used the more secure the system would be.

* * * * *